US012664260B2

(12) United States Patent
Gui et al.

(10) Patent No.: US 12,664,260 B2
(45) Date of Patent: Jun. 23, 2026

(54) SYSTEM AND METHOD FOR AUTOMATED INTEGRATION OF ENDPOINT DETECTION AND RESPONSE (EDR) DATA TO OPEN EXTENDED DETECTION AND RESPONSE (XDR) FRAMEWORK

(71) Applicant: Stellar Cyber, Inc., Santa Clara, CA (US)

(72) Inventors: Jiaping Gui, Shanghai (CN); Qi Wang, Champaign, IL (US); Zhichun Li, Campbell, CA (US); Peng Fei, San Jose, CA (US)

(73) Assignee: STELLAR CYBER, INC., Santa Clara, CA (US)

( * ) Notice: Subject to any disclaimer, the term of this patent is extended or adjusted under 35 U.S.C. 154(b) by 601 days.

(21) Appl. No.: 18/105,135

(22) Filed: Feb. 2, 2023

(65) Prior Publication Data
US 2023/0252134 A1      Aug. 10, 2023

Related U.S. Application Data

(60) Provisional application No. 63/307,877, filed on Feb. 8, 2022.

(51) Int. Cl.
*G06F 21/55* (2013.01)

(52) U.S. Cl.
CPC ...... *G06F 21/552* (2013.01); *G06F 2221/033* (2013.01); *G06F 2221/034* (2013.01)

(58) Field of Classification Search
CPC ............. G06F 21/552; G06F 2221/033; G06F 2221/034; G06F 21/556; G06F 9/547;
(Continued)

(56) References Cited

U.S. PATENT DOCUMENTS

| | | | | |
|---|---|---|---|---|
| 11,290,483 B1 * | 3/2022 | Kannan | ............... | H04L 63/1433 |
| 11,349,855 B1 * | 5/2022 | Amit | ....................... | G06F 9/547 |

(Continued)

FOREIGN PATENT DOCUMENTS

| | | | | | |
|---|---|---|---|---|---|
| CN | 110677287 A | * | 1/2020 | ......... | H04L 41/0604 |

OTHER PUBLICATIONS

George DA, George AH, Baskar T, Pandey D. XDR: the evolution of endpoint security solutions-superior extensibility and analytics to satisfy the organizational needs of the future. International Journal of Advanced Research in Science, Communication and Technology (IJARSCT). Aug. 2021;8(1):493-501. (Year: 2021).*

(Continued)

*Primary Examiner* — Catherine Thiaw

(57) ABSTRACT

A new approach is proposed to support integration of EDR data from a plurality of EDR tools/sources into an Open XDR framework in an automated manner. First, EDR data generated by each of the plurality of EDR tools covering a plurality of assets is ingested into the Open XDR framework. The ingested EDR data is then normalized through a unified EDR data model. The normalized EDR data is further enriched with one or more new data fields to better correlate the EDR normalized data from the plurality of EDR tools. A plurality of alerts are then generated from the normalized and enriched data along one or more alert pathways to improve fidelity of the plurality of alerts. The plurality of alerts are correlated with the contextual information of the plurality of assets as well as information from other data sources to identify a set of incidents of suspicious activities.

26 Claims, 3 Drawing Sheets

(58) Field of Classification Search
CPC ..... G06F 16/29; H04L 63/20; H04L 63/1466;
H04L 63/1416; H04L 63/0272; H04L
63/1433; H04L 43/04; G06N 5/046
See application file for complete search history.

(56) References Cited

U.S. PATENT DOCUMENTS

| | | | |
|---|---|---|---|
| 11,853,853 B1 * | 12/2023 | Beauchesne | H04L 63/1433 |
| 12,250,234 B2 * | 3/2025 | Dwyer | H04L 63/20 |
| 2018/0316708 A1 * | 11/2018 | Strong | H04L 43/04 |
| 2018/0357334 A1 * | 12/2018 | Chao | G05B 19/41885 |
| 2020/0076833 A1 * | 3/2020 | Ladnai | G06N 5/046 |
| 2021/0099467 A1 * | 4/2021 | March | H04L 63/20 |
| 2021/0216928 A1 * | 7/2021 | O'Toole | G06F 16/29 |
| 2022/0086173 A1 * | 3/2022 | Yavo | H04L 63/1416 |
| 2022/0210199 A1 * | 6/2022 | Lanzi | H04L 63/0272 |
| 2023/0095415 A1 * | 3/2023 | Boyer | G06F 21/556 |
| | | | 726/23 |
| 2023/0224324 A1 * | 7/2023 | Karabey | H04L 63/1466 |
| | | | 726/23 |

OTHER PUBLICATIONS

Nicolaescu AC, Mastorakis S, Psaras I. Store edge networked data (SEND): A data and performance driven edge storage framework. InIEEE Infocom 2021—IEEE Conference on Computer Communications May 10, 2021 (pp. 1-10). IEEE. (Year: 2021).*

* cited by examiner

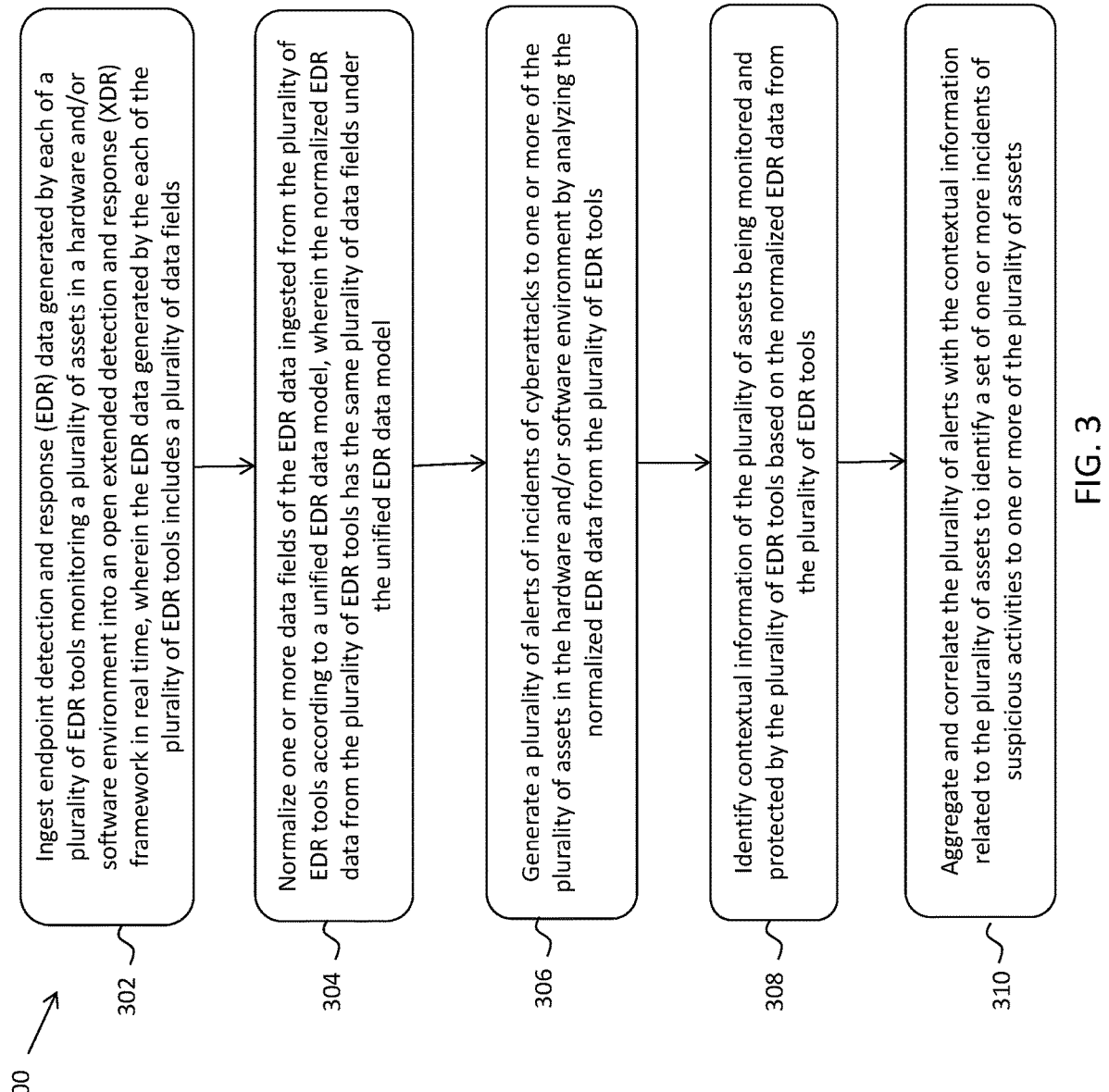

300

302 Ingest endpoint detection and response (EDR) data generated by each of a plurality of EDR tools monitoring a plurality of assets in a hardware and/or software environment into an open extended detection and response (XDR) framework in real time, wherein the EDR data generated by the each of the plurality of EDR tools includes a plurality of data fields 304 Normalize one or more data fields of the EDR data ingested from the plurality of EDR tools according to a unified EDR data model, wherein the normalized EDR data from the plurality of EDR tools has the same plurality of data fields under the unified EDR data model 306 Generate a plurality of alerts of incidents of cyberattacks to one or more of the plurality of assets in the hardware and/or software environment by analyzing the normalized EDR data from the plurality of EDR tools 308 Identify contextual information of the plurality of assets being monitored and protected by the plurality of EDR tools based on the normalized EDR data from the plurality of EDR tools 310 Aggregate and correlate the plurality of alerts with the contextual information related to the plurality of assets to identify a set of one or more incidents of suspicious activities to one or more of the plurality of assets

FIG. 3

SYSTEM AND METHOD FOR AUTOMATED INTEGRATION OF ENDPOINT DETECTION AND RESPONSE (EDR) DATA TO OPEN EXTENDED DETECTION AND RESPONSE (XDR) FRAMEWORK

CROSS-REFERENCE TO RELATED APPLICATIONS

This application claims the benefit of U.S. Provisional Patent Application No. 63/307,877, filed Feb. 8, 2022, which is incorporated herein in its entirety by reference.

BACKGROUND

In recent years, open extended detection and response (XDR) framework has become an emerging platform that provides high-speed, high-fidelity detection and automated response to cyberattacks (or attacks) across an entire attack surface of a hardware and/or software environment where an unauthorized user can launch a cyberattack by trying to enter data to or extract data from the environment. Here, the hardware and/or software environment may include a plurality of assets of hardware and/or software components. Open XDR collects and correlates data from all existing security tools, including endpoint detection and response (EDR) tools/sources deployed at endpoints and used to monitor and detect at a cyberattacks to the assets in the environment. However, it is often challenging to automatically integrate EDR data generated by the EDR tools into the Open XDR framework due to one or more of the following reasons. First, existing EDR tools (e.g., CrowdStrike, Carbon Black, Cylance, SentinelOne) are highly heterogeneous as they apply different monitoring mechanisms and detection techniques with different sets of data fields describing various alerts and events generated by the EDR tools. Second, the data generated by some EDR tools could be noisy and of low fidelity. For a non-limiting example, some EDR tools could generate a large number of alerts or events when a match/hit on any rule/policy of a watchlist is triggered even though hits on such watchlist may or may not be indicative of a malicious activity but are generally more suspicious in nature. Currently there is no effective way to improve the fidelity of these EDR alerts. Third, alerts generated from different EDR tools are independent of each other, which makes automatic correlation among these alerts in order to identify an incident that may include multiple suspicious events across multiple EDR tools, difficult.

Currently, state-of-the art techniques cannot tackle the challenges above. Although some EDR tools have already applied some type of alert deduplication mechanism, e.g., Carbon Black Cloud (e.g., https://www.vmware.com/products/carbon-black-cloud-endpoint.html) displays the number of occurrences of each alert on a console beside first seen information of the each alert, such mechanism does not consider the timeliness and alert-fatigue problem. For a non-limiting example, each alert may have a different importance degree in different contexts, and grouping alerts without considering their contextual information would make the alerts noisier or miss some important information. Furthermore, the mechanism introduced in the existing EDR tools could still lead to alert fatigue if there are many alerts generated within a short period of time even if the alerts have been deduplicated.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts a flowchart of an example of a process to support automated EDR data integration into an Open XDR framework in accordance with some embodiments.

DETAILED DESCRIPTION OF EMBODIMENTS

Figure 1:
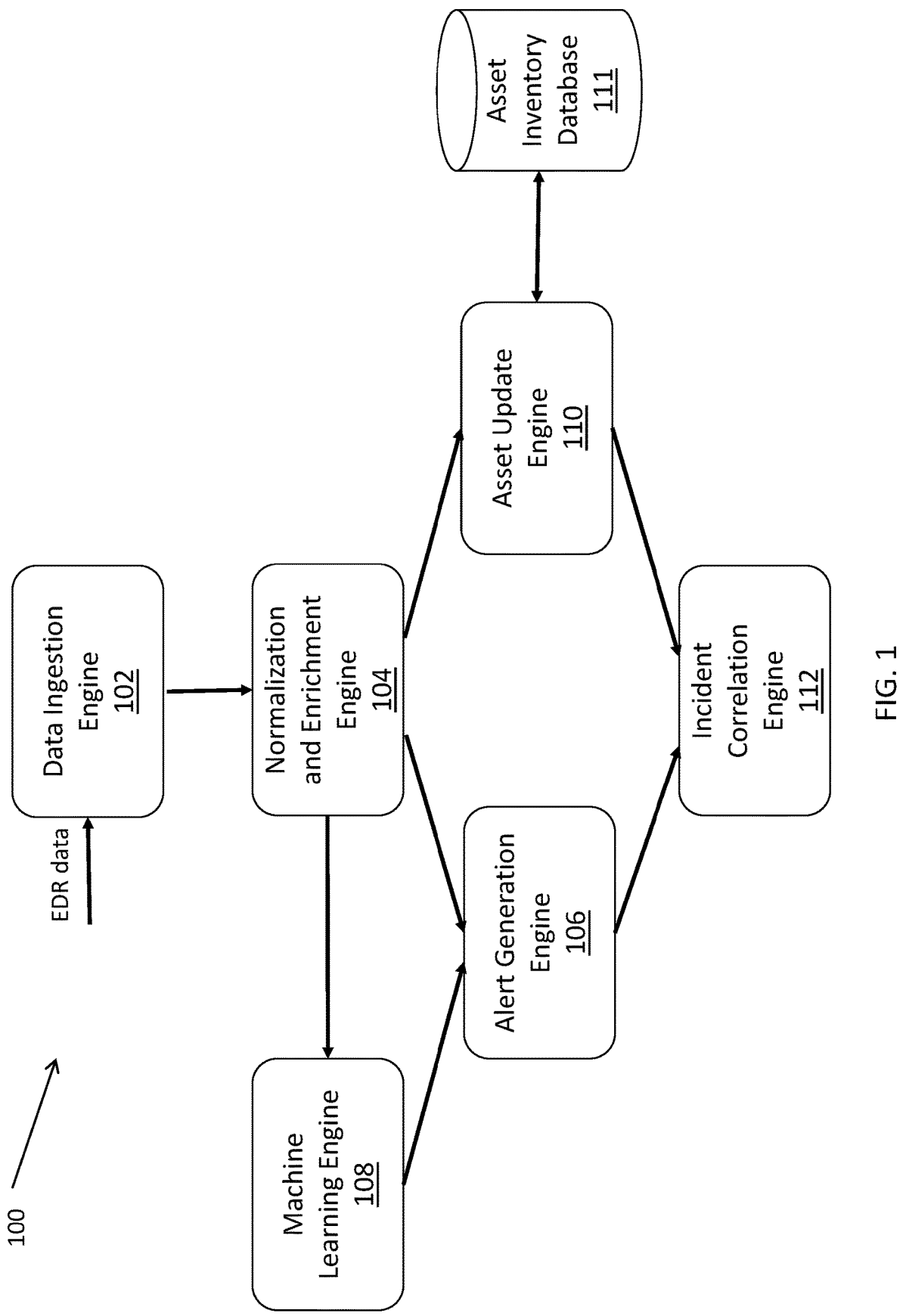
FIG. 1 depicts an example of a system diagram to support automated EDR data integration into an Open XDR framework in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support integration of EDR data from a plurality of EDR tools/sources into an Open XDR framework in an automated manner. First, EDR data generated by each of the plurality of EDR tools covering a plurality of assets being monitored and protected in a hardware and/or software environment is ingested into the Open XDR framework. The ingested EDR data is then normalized through a unified EDR data model to address heterogeneous issues caused by the plurality of different EDR tools. In some embodiments, the normalized EDR data is further enriched with one or more new data fields to better correlate the EDR normalized data from the plurality of EDR tools. A plurality of alerts are then generated from the normalized and enriched data along one or more alert pathways to improve fidelity of the plurality of alerts. In some embodiments, contextual information of the plurality of assets is identified based on the normalized and enriched EDR data from the plurality of EDR tools. Finally, the plurality of alerts are correlated with the contextual information as well as information from other data sources to identify a set of incidents of suspicious activities (e.g., cyberattacks).

The proposed approach provides a robust and unique way of handling data from different EDR tools into the Open XDR framework to ensure high-fidelity of EDR data correlating with the rest of the Open XDR framework. This approach achieves complete coverage of the plurality of assets in the hardware and/or software environment. Compared to current methods, the proposed approach addresses problems of integrating various EDR solutions by leveraging asset vulnerability assessment and incident correlation.

As a result, the proposed approach improves fidelity of the generated alerts and removes noisy data to make incident investigation more effective and efficient.

FIG. 1 depicts an example of a system diagram 100 to support automated EDR tool integration into an Open XDR framework. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least one or more of a data ingestion engine 102, a normalization and enrichment engine 104, an alert generation engine 106, a machine learning engine 108, an asset update engine 110, and an incident correlation engine 112. These engines in the system 100 each run on one or more computing units/appliances/devices/hosts (not shown) each having one or more processors and software instructions stored in a storage unit such as a non-volatile memory of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that, the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each of the engines is associated with one or more communication networks (not shown), which can be but is not limited to, Internet, intranet, wide area network (WAN), local area network (LAN), wireless network, Bluetooth, WiFi, and mobile communication network for communications among the engines. The physical connections of the communication networks and the communication protocols are well known to those skilled in the art.

In the example of FIG. 1, the data ingestion engine 102 is configured to monitor and ingest EDR data generated by each of a plurality of EDR tools/sources monitoring a plurality of assets in a hardware and/or software environment into an Open XDR framework in real time. Here, the EDR data are alerts and events generated by the plurality of EDR tools, wherein the EDR data includes a plurality of data fields. In some embodiments, the EDR data is ingested into the Open XDR framework for processing in its raw/original format as generated by the each of the plurality of EDR tools. In some embodiments, the plurality of EDR tools are heterogeneous as they apply different monitoring mechanisms and/or detection techniques with different sets of data fields in the EDR data describing various alerts and/or events generated by the plurality of EDR tools. Here, the alerts and/or events may be indicative of an incident of a suspicious cyberattack that has been detected by one or more of the plurality of EDR tools. In some embodiments, the EDR data ingested from one or more of the plurality of EDR tools is noisy and of low fidelity, wherein such noisy data may include false alert(s) of an incident. In some embodiments, the plurality of EDR tools work independently from each other wherein the EDR data generated by the plurality of EDR tools is un-correlated.

In some embodiments, the data ingestion engine 102 is configured to monitor and ingest the EDR data in real time in either pull-based or push-based way depending on the types of the plurality of EDR tools. If an EDR tool only provides an Application Programming interface (API), e.g., REST API, for retrieving the EDR data, the data ingestion engine 102 is configured to use the pull-based way, which periodically polls the API to get the EDR data. If an EDR tool supports data streaming, the data ingestion engine 102 is configured to receive the EDR data in a push-based way in which data is pushed from the EDR tool. As the raw data ingested from an EDR tool could be out-of-order, in some embodiments, the data ingestion engine 102 is configured to buffer the EDR data from an EDR tool/source for a short time, reorders the EDR data, then ingest the EDR data through a stream processing pipeline to make the downstream tasks easier.

In some embodiments, the ingested EDR data describes one or more of events, alerts, and other activities detected by the plurality of EDR tools at one or more endpoints. For non-limiting examples, the EDR data includes data about detected processes, files, network, users and registries at the endpoints. In the example of FIG. 1, the normalization and enrichment engine 104 is configured to process and normalize one or more data fields of the EDR data ingested from the plurality of EDR tools by the data ingestion engine 102 according to a unified EDR data model. For non-limiting examples, the following table lists some entities/fields in the unified data model:

| Entity | Description |
| --- | --- |
| User | A user of the endpoint. For example, an administrator or a normal user. |
| Process | A process in a host. |
| File | A file in a host. |
| Registry | A registry entry in a Windows host. |
| Socket/Network | A software structure for sending and receiving data. |

In some embodiments, the normalization and enrichment engine 104 is configured to check each field in the raw data to determine if there is any predefined rule to normalize the field based on the field name and the field value type. If there is no predefined rule for the field, the normalization and enrichment engine 104 is configured to utilize a machine learning (ML) model to determine the normalized field. For a non-limiting example, different EDR data sources may use different field names for the process involved in an event, such as process_name and/or image_name, to record the name of the process. In this case, the normalization and enrichment engine 104 is configured to normalize both fields into the unified field name—process.name. In some embodiments, a ML model that uses natural language processing (NLP) techniques can be utilized to identify the semantic similarity of the field names.

Under the unified EDR data model, the normalized EDR data from the plurality of EDR tools has the same plurality of data fields and thus addresses any heterogenous issues among the plurality of EDR tools. In some embodiments, the unified data model is consistent or compatible with other components of the Open XDR framework, wherein such components include but are not limited to a Network Detection and Response (NDR) component utilized by the Open XDR framework to detect and respond to cyberattacks.

In some embodiments, the normalization and enrichment engine 104 is configured to enrich the normalized EDR data by inserting one or more additional data fields with one or more of contextual and/or security information such as tactics, techniques adopted by the plurality of EDR tools and severity of events detected by the plurality of EDR tools in order to better correlate the normalized EDR data generated by the plurality of EDR tools. For non-limiting examples, the one or more additional data fields may include but are not limited to a fidelity score of the EDR data from each of the plurality of EDR tools, an XDR kill chain designed to characterize every aspect of a detected incident, etc. In some embodiments, the normalization and enrichment engine 104 is configured to first check if there is any predefined rule for the enrichment. If not, a ML model is employed to enrich security relevant information. For a non-limiting example, the ML model may infer certain factors such as tactics and technique used in the event if they are not provided in the EDR data. The following table some examples of factors.

| Factor | Description |
| --- | --- |
| Tactic | The detected tactic of the attacker in this activity. |
| Technique | The attacker's technique used in this activity. |
| Kill Chain Stage | The kill chain stage of the attack when an alert was raised. |

In some embodiments, the normalization and enrichment engine 104 supports identification of multiple tactics, techniques, and procedures (TTPs) and is configured to map the identified tactics and techniques to an industry standard, e.g., MITRE ATTACK framework.

In the example of FIG. 1, the alert generation engine 106 is configured to generate a plurality of alerts of incidents of cyberattacks to one or more of the plurality of assets in the hardware and/or software environment by analyzing the normalized and enriched EDR data from the plurality of EDR tools. In some embodiments, the alert generation engine 106 is configured to maintain a fidelity model of each type of EDR data from each of the plurality of EDR tools based on historical data from the plurality of EDR tools. In some embodiments, the alert generation engine 106 is configured to generate the plurality of alerts along one or more alert pathways/techniques to improve fidelity of the plurality of alerts generated, wherein the types of one or more alert pathways are shown by the example depicted in FIG. 2.

Figure 2:
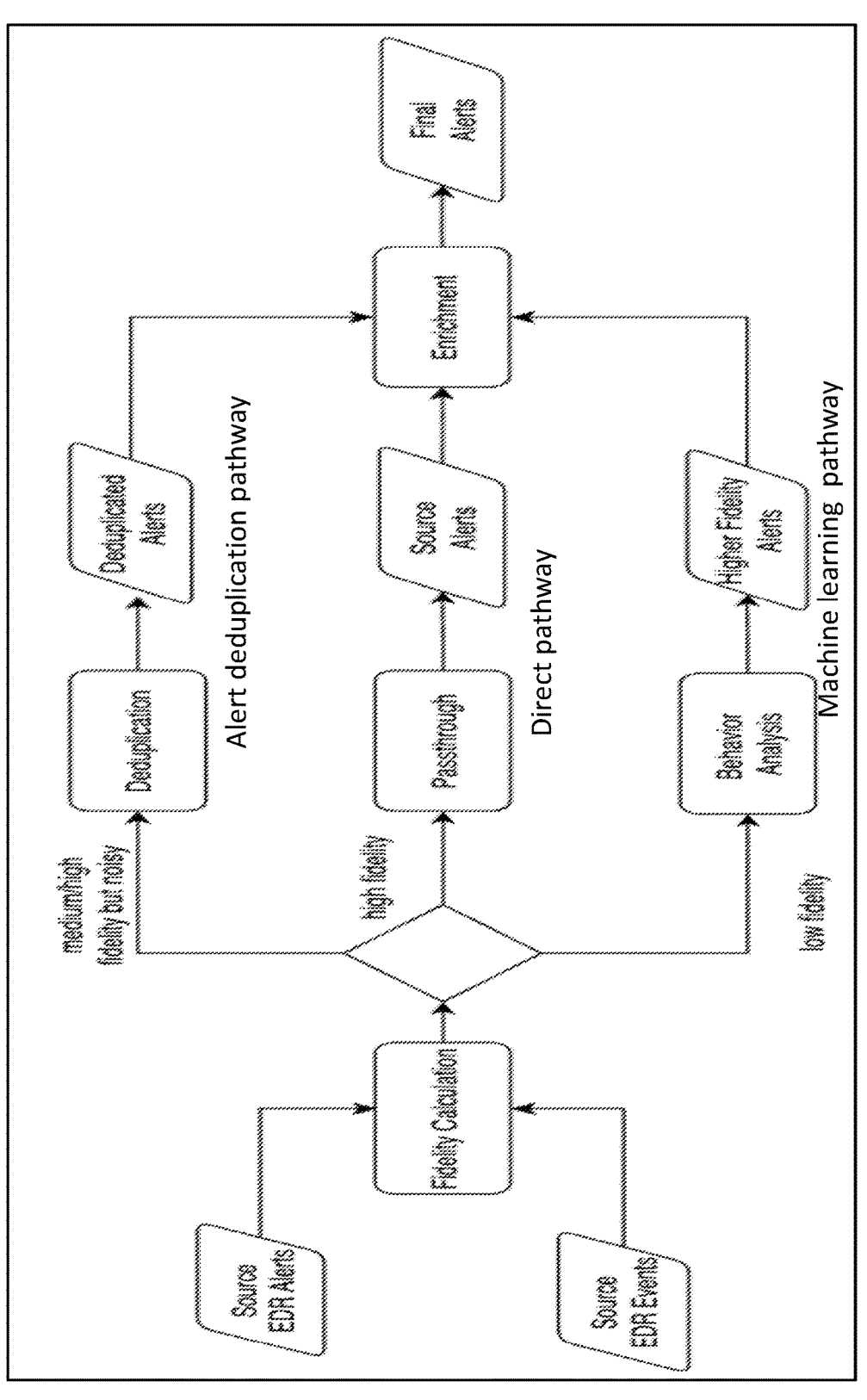
FIG. 2 depicts examples of alert pathways used to improve fidelity of the plurality of alerts generated in accordance with some embodiments.

As shown by the example of FIG. 2, when a new EDR data (e.g., alert, event, etc.) generated by one of the plurality of EDR tools comes in, the alert generation engine 106 is configured to first calculate a fidelity score of the new EDR data based on its fidelity model. If the new EDR data has a high fidelity score, the alert generation engine 106 will pass the EDR data along a direct pathway to be directly included as one of the plurality of alerts.

If the new EDR data has a medium or high but noisy fidelity score, the alert generation engine 106 will summarize and deduplicate the noisy EDR data to a lower noisy alert along an alert deduplication pathway before including the lower noisy alert as one of the plurality of alerts. In some embodiments, the alert generation engine 106 reduces noise by selecting a single representative raw record of an alert from multiple, similar alerts within a certain time frame (e.g., 24 hours). In some embodiments, the alert generation engine 106 takes into account factors such as alert type, file name, and process name. In some embodiments, the alert generation engine 106 uses different methods for deduplication based on the alerts' information from different EDR tools.

If the new EDR data has a low fidelity score, the machine learning engine 108 shown in the example of FIG. 1 will be triggered, wherein the machine learning engine 108 is configured to perform behavioral analysis on the new EDR data to identify a set of abnormal behaviors. In some embodiments, the machine learning engine 108 is configured to utilize historical statistical data of the ingested EDR data and/or security analysts' feedback to train and update a model for the EDR data from each of the plurality of EDR tools/sources, wherein the model is used to calculate fidelity and accuracy of the EDR data. The following are non-limiting examples of statistical features used to train the model of an EDR tool/source:

The volume of data ingested from that source
The number of endpoints/assets identified in the ingested data
The number of alerts from the source EDR data
The number of final alerts
The number of false positive alerts identified by security analysts The alert generation engine 106 is then configured to produce a higher-fidelity alert by applying one or more models trained with historical data to the set of abnormal behaviors along a machine learning pathway to improve fidelity and accuracy of the higher-fidelity alert. Finally, the alert generation engine 106 is configured to include the higher-fidelity alert as one of the plurality of alerts. In some embodiments, the alerts generated by the pathways above will go through an enrichment process to include additional data or context information before being finalized as the plurality of alerts. The following tables includes examples of information included in the plurality of finalized alerts. The alert generation engine 106 also ensures that the original raw EDR data related to the finalized alerts are available for further analysis to avoid loss of information.

| Factor | Description |
| --- | --- |
| Severity | How severe the consequences of a successful implementation of the attack would be |
| Fidelity | The confidence to raise this alert. |
| Likelihood | How likely a particular attack pattern is to be successful, taking into account factors such as the attack prerequisites, the required attacker resources, and the effectiveness of countermeasures that are likely to be implemented. |

In some embodiments, the alert generation engine 106 is configured to generate a personalized description for each of the plurality of alerts generated in order to make the alerts easier for security analysts to understand. In some embodiments, the alert generation engine 106 uses ML and/or NLP techniques to generate a description of the alert containing description from the EDR data, if any, one or more involved entities (e.g., hosts, processes, and files).

In the example of FIG. 1, the asset update engine 110 is configured to identify an inventory of a plurality of assets being monitored and protected by the plurality of EDR tools and their contextual information, e.g., asset information and vulnerability information, based on the normalized and enriched EDR data from the plurality of EDR tools. Here, the asset information of the plurality of assets in the asset inventory includes but is not limited to types and numbers of various hardware and/or software components deployed in the hardware and/or software environment. In some embodiments, the asset update engine 110 is configured to identify the plurality of assets from the EDR data based on one or more of the following information: the host IP, the hostname or computer name, the MAC address, the other hosts the host talks to. Since the host IP, the hostname and/or the MAC address can be changed. the asset update engine 110 is configured to uses a ML model to determine if two identified assets are the same asset. In some embodiments, the ML model is also utilized to identify if an asset is a real asset or not. For a non-limiting example, the EDR data could contain network activities reaching out to many IPs that are not real assets when doing port scanning.

In some embodiments, the vulnerability information of the plurality of assets in the asset inventory includes one or more asset-related vulnerability scores calculated by the asset update engine 110 for the plurality of assets in the asset inventory, wherein the asset-related vulnerability scores provide another dimension of information that can be utilized to better investigate and correlate the plurality of alerts generated by the alert generation engine 106. In some embodiments, the vulnerability information of the plurality of assets in the asset inventory further includes other contextual information of the plurality of assets, e.g., previously identified Common Vulnerabilities and Exposures (CVEs) on the plurality of assets in the asset inventory, to be combined with the one or more asset-related vulnerability scores. In some embodiments, the asset update engine 110 is configured to maintain and update the asset information and the vulnerability information of the plurality of assets in the asset inventory to an asset inventory database 111.

In the example of FIG. 1, the incident correlation engine 112 is configured to aggregate and correlate the plurality of alerts generated by the alert generation engine 106 with the contextual information related to the plurality of assets generated by the asset update engine 110 to identify a set of one or more incidents of suspicious activities (e.g., cyberattacks) to one or more of the plurality of assets. In some embodiments, the incident correlation engine 112 is configured to correlate the plurality of alerts with other network monitoring data generated from other data sources, e.g., NDR, by leveraging both spatial (e.g., the asset-related vulnerability scores) and temporal (e.g., timestamps of the alerts) information of the plurality of alerts and to assist a user (e.g., a security analyst) to investigate the set of incidents. In some embodiments, the incident correlation engine 112 is configured to learn and identify one or more correlation features in the plurality of alerts that could be used to establish correlated alerts. The incident correlation engine 112 then models one or more of entities/observables and alerts on a temporal alert observable graph and utilizes a graph-based incident learning approach to create the incidents by analyzing the relationships between the alerts and underlying raw data/events.

FIG. 3 depicts a flowchart 300 of an example of a process to support automated EDR tool integration into an Open XDR framework. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where EDR data generated by each of a plurality of EDR tools monitoring a plurality of assets in a hardware and/or software environment is ingested into an open XDR framework in real time, wherein the EDR data generated by the each of the plurality of EDR tools includes a plurality of data fields. The flowchart 300 continues to block 304, where one or more data fields of the EDR data ingested from the plurality of EDR tools are normalized according to a unified EDR data model, wherein the normalized EDR data from the plurality of EDR tools has the same plurality of data fields under the unified EDR data model. The flowchart 300 continues to block 306, where a plurality of alerts of incidents of cyberattacks to one or more of the plurality of assets in the hardware and/or software environment are generated by analyzing the normalized EDR data from the plurality of EDR tools. The flowchart 300 continues to block 308, where contextual information of the plurality of assets being monitored and protected by the plurality of EDR tools is identified based on the normalized EDR data from the plurality of EDR tools. The flowchart 300 ends at block 310, where the plurality of alerts are aggregated and correlated with the contextual information related to the plurality of assets to identify a set of one or more incidents of suspicious activities to one or more of the plurality of assets.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine-readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application-specific integrated circuits for performing the methods.

What is claimed is:

1. A system, comprising:
a processor;
a data ingestion engine running on the processor, wherein the data ingestion engine is configured to ingest endpoint detection and response (EDR) data generated by each of a plurality of EDR tools monitoring a plurality of assets in a hardware and/or software environment into an open extended detection and response (XDR) framework in real time, wherein the EDR data generated by the each of the plurality of EDR tools includes a plurality of data fields;

a normalization and enrichment engine running on the processor, wherein the normalization and enrichment engine is configured to normalize one or more data fields of the EDR data ingested from the plurality of EDR tools according to a unified EDR data model, wherein the normalized EDR data from the plurality of EDR tools has the same plurality of data fields under the unified EDR data model;

an alert generation engine running on the processor, wherein the alert generation engine is configured to generate a plurality of alerts of incidents of cyberattacks to one or more of the plurality of assets in the hardware and/or software environment by analyzing the normalized EDR data from the plurality of EDR tools;

an asset update engine running on the processor, wherein the asset update engine is configured to identify contextual information of the plurality of assets being monitored and protected by the plurality of EDR tools based on the normalized EDR data from the plurality of EDR tools;

an incident correlation engine running on the processor, wherein the incident correlation engine is configured to aggregate and correlate the plurality of alerts with the contextual information related to the plurality of assets to identify a set of one or more incidents of suspicious activities to one or more of the plurality of assets.

2. The system of claim 1, wherein:

the data ingestion engine is configured to ingest the EDR data in its raw/original format.

3. The system of claim 1, wherein:

the plurality of EDR tools are heterogeneous.

4. The system of claim 1, wherein:

the unified data model is consistent or compatible with other components utilized by the Open XDR framework to detect and respond to cyberattacks.

5. The system of claim 1, wherein:

the normalization and enrichment engine is configured to enrich the normalized EDR data by inserting one or more additional data fields with one or more of contextual and/or security information of the plurality of EDR tools and severity of events detected by the plurality of EDR tools.

6. The system of claim 1, wherein:

the alert generation engine is configured to maintain a fidelity model of each type of EDR data generated by each of the plurality of EDR tools based on historical data from the plurality of EDR tools.

7. The system of claim 6, wherein:

the alert generation engine is configured to generate the plurality of alerts along one or more alert pathways to improve fidelity of the plurality of alerts generated.

8. The system of claim 7, wherein:

the alert generation engine is configured to calculate a fidelity score of a new EDR data generated by one of the plurality of EDR tools based on its fidelity model.

9. The system of claim 8, wherein:

the alert generation engine is configured to pass the new EDR data along a direct pathway to be directly included as one of the plurality of alerts if the new EDR data has a high fidelity score.

10. The system of claim 8, wherein:

the alert generation engine is configured to summarize and deduplicate the new EDR data to a lower noisy alert along an alert deduplication pathway before including the lower noisy alert as one of the plurality of alerts if the new EDR data has a medium or high but noisy fidelity score.

11. The system of claim 8, further comprising:

a machine learning engine configured to perform behavioral analysis on the new EDR data to identify a set of abnormal behaviors if the new EDR data has a low fidelity score.

12. The system of claim 11, wherein:

the alert generation engine is configured to produce a higher-fidelity alert by applying one or more models trained with historical data to the set of abnormal behaviors along a machine learning pathway to improve fidelity and accuracy of the higher-fidelity alert before including the higher-fidelity alert as one of the plurality of alerts.

13. The system of claim 1, wherein:

the context information includes asset information including types and numbers of hardware and/or software components deployed in the hardware and/or software environment.

14. The system of claim 1, wherein:

the context information includes vulnerability information of the plurality of assets in the asset inventory including one or more asset-related vulnerability scores calculated for the plurality of assets in the asset inventory.

15. The system of claim 14, wherein:

the vulnerability information of the plurality of assets in the asset inventory further includes other contextual information of the plurality of assets to be combined with the one or more asset-related vulnerability scores.

16. The system of claim 1, wherein:

the incident correlation engine is configured to correlate the plurality of alerts with other network monitoring data generated from other data sources by leveraging both spatial and temporal information to correlate the plurality of alerts.

17. A computer-implemented method, comprising:

ingesting endpoint detection and response (EDR) data generated by each of a plurality of EDR tools monitoring a plurality of assets in a hardware and/or software environment into an open extended detection and response (XDR) framework in real time, wherein the EDR data generated by the each of the plurality of EDR tools includes a plurality of data fields;

normalizing one or more data fields of the EDR data ingested from the plurality of EDR tools according to a unified EDR data model, wherein the normalized EDR data from the plurality of EDR tools has the same plurality of data fields under the unified EDR data model;

generating a plurality of alerts of incidents of cyberattacks to one or more of the plurality of assets in the hardware and/or software environment by analyzing the normalized EDR data from the plurality of EDR tools;

identifying contextual information of the plurality of assets being monitored and protected by the plurality of EDR tools based on the normalized EDR data from the plurality of EDR tools;

aggregating and correlating the plurality of alerts with the contextual information related to the plurality of assets to identify a set of one or more incidents of suspicious activities to one or more of the plurality of assets.

18. The method of claim 17, further comprising:

enriching the normalized EDR data by inserting one or more additional data fields with one or more of contextual and/or security information of the plurality of EDR tools and severity of events detected by the plurality of EDR tools.

19. The method of claim 17, further comprising:

maintaining a fidelity model of each type of EDR data generated by each of the plurality of EDR tools based on historical data from the plurality of EDR tools.

20. The method of claim 19, further comprising:

generating the plurality of alerts along one or more alert pathways to improve fidelity of the plurality of alerts generated.

21. The method of claim 20, further comprising:

calculating a fidelity score of a new EDR data generated by one of the plurality of EDR tools based on its fidelity model.

22. The method of claim 21, further comprising:

passing the new EDR data along a direct pathway to be directly included as one of the plurality of alerts if the new EDR data has a high fidelity score.

23. The method of claim 21, further comprising:

summarizing and deduplicating the new EDR data to a lower noisy alert along an alert deduplication pathway before including the lower noisy alert as one of the plurality of alerts if the new EDR data has a medium or high but noisy fidelity score.

24. The method of claim 21, further comprising:

performing behavioral analysis on the new EDR data to identify a set of abnormal behaviors if the new EDR data has a low fidelity score.

25. The method of claim 24, further comprising:

producing a higher-fidelity alert by applying one or more models trained with historical data to the set of abnormal behaviors along a machine learning pathway to improve fidelity and accuracy of the higher-fidelity alert before including the higher-fidelity alert as one of the plurality of alerts.

26. The method of claim 17, further comprising:

correlating the plurality of alerts with other network monitoring data generated from other data sources by leveraging both spatial and temporal information to correlate the plurality of alerts.

* * * * *